United States Patent [19]
Stritzke et al.

[11] Patent Number: 4,811,960
[45] Date of Patent: Mar. 14, 1989

[54] FIXED VALVE STEM OIL SEAL

[75] Inventors: Bernard G. Stritzke, Hanover Park; Brian F. Rericha, Downers Grove, both of Ill.

[73] Assignee: Microdot Inc., Darien, Conn.

[21] Appl. No.: 85,745

[22] Filed: Aug. 10, 1987

[51] Int. Cl.[4] .............................. F16J 15/32
[52] U.S. Cl. .................. 277/153; 123/188 P
[58] Field of Search ............ 277/153, 183, 184; 123/188 P

[56] References Cited

U.S. PATENT DOCUMENTS

| | | | |
|---|---|---|---|
| 1,507,567 | 9/1924 | Aschenbach | 277/153 |
| 3,333,578 | 8/1967 | Müller | 123/188 P |
| 3,450,411 | 6/1969 | Skinner | 123/188 P |
| 3,599,992 | 8/1971 | Kammeraad | 123/188 P X |
| 3,829,105 | 8/1974 | Kammeraad | 123/188 P X |
| 4,278,261 | 7/1981 | Miura et al. | 277/153 |

*Primary Examiner*—Donald A. Griffin
*Attorney, Agent, or Firm*—Lyman R. Lyon

[57] ABSTRACT

A fixed valve stem oil seal comprises cup-shaped inner and outer cases engageable with the valve guide of a piston-type internal combustion engine. A seal element is disposed between radial flanges on the cases so as to be radially movable relative thereto. The seal element is slidably engageable with the valve stem and said cases so as to effect a seal between the valve and valve guide.

3 Claims, 1 Drawing Sheet

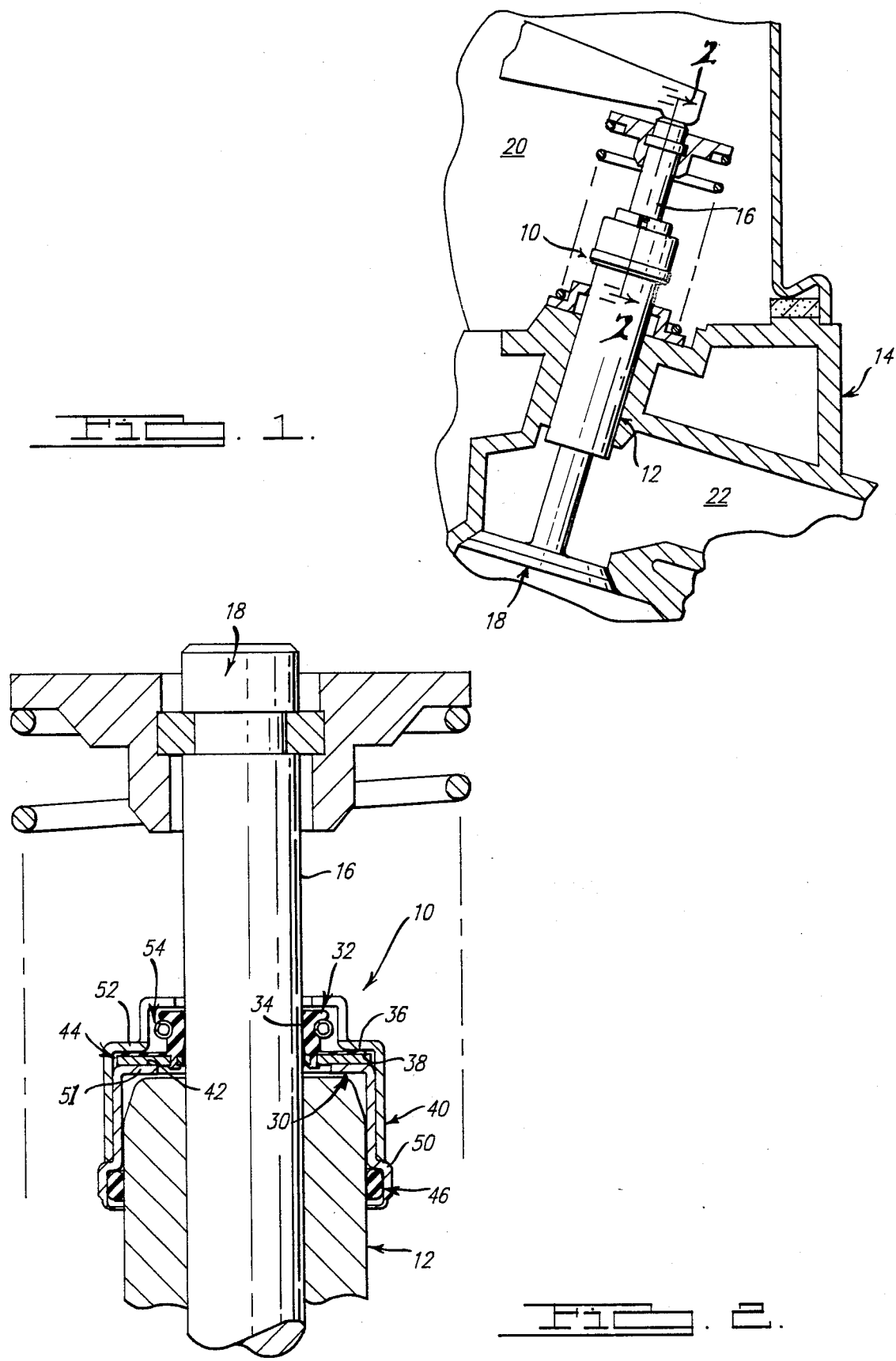

FIXED VALVE STEM OIL SEAL

BACKGROUND OF THE INVENTION

Valve stem oil deflectors are generally secured to the valve stem so as to reciprocate therewith. While such oil deflectors attenuate destructive environmental conditions internally of the valve chamber of an internal combustion engine by eliminating sliding, sealing contact between the deflector and the valve stem, such known oil deflectors have a basic deficiency in that the valve stem and guide are not completely sealed from the ambient conditions within the valve chamber of the engine.

One solution to the aforesaid problem is a valve stem oil seal that is positively mounted on the valve guide as taught in Application Ser. No. 07/044,709; filed May 1, 1987; for "Fixed Valve Stem Oil Deflector" and assigned to the assignee hereof. However, a problem has arisen in that positive mounting of known valve stem oil seals does not accommodate misalignment between the central axis of the valve stem and the central axis of the valve guide due to manufacturing tolerance error or operating conditions.

SUMMARY OF THE INVENTION

The instant invention relates to a valve stem oil seal that is mounted on the valve guide of an internal combustion engine so as to positively seal the valve stem and valve guide from the environment of the valve chamber yet accommodate misalignment of the central axis of the valve and valve guide. The oil seal comprises a cup-shaped inner case that supports a laterally movable resilient seal element. The seal element has a radially inwardly facing sealing surface that engages the valve stem and an axially facing sealing surface that engages a complementary surface on a cup-shaped outer case.

More specifically, the fixed valve stem oil seal of the instant invention comprises a cup-shaped inner case which supports an "O-ring" or other means of holding and sealing the case to the guide. A radially inwardly extending flange on the inner case serves as a sliding surface for a seal support washer. An elastomeric seal is bonded to the seal support washer and seals against both the valve stem and a radially extending surface of an outer case. Thus a seal is maintained against the outer case when the seal support washer and valve stem seal assembly shifts to center itself on the valve stem upon installation. The outer case is press fit in nesting relationship over the inner case with the seal support washer in position therebetween. The outer case bottoms out on a radial flange on the inner case, thereby to maintain a constant gap between radial flanges on the inner and outer cases which allows the washer and seal to move radially therebetween while maintaining a constant seal. The outer case extends upwardly to substantially enclose the top of the seal element as well as to retain a garter spring within the assembly in the event that it pops out of a groove in the seal element. The flat seal support washer is made of a relatively soft material (e.g. plastic) with an I.D. slightly larger than the valve stem O.D. so as to center the seal around the valve stem yet wear before the valve stem in the event of interference.

BRIEF DESCRIPTION OF THE DRAWINGS

FIG. 1 is a fragmentary view, partially in section, of a fixed valve stem oil seal in its operating environment.

FIG. 2 is a cross-sectional view taken along the line 2—2 of FIG. 1.

DETAILED DESCRIPTION OF THE PREFERRED EMBODIMENT OF THE INVENTION

As seen in FIG. 1, a valve stem oil seal 10, in accordance with a preferred constructed embodiment of the present invention is mounted on a valve guide 12 of an internal combustion engine 14 so as to positively seal a valve stem 16 of a valve 18 relative to the valve guide 12. The oil seal 10 seals the environment of a valve chamber 20 from an intake or exhaust manifold 22 yet accommodates misalignment of the central axis of the valve 18 and valve guide 12.

The oil seal 10 comprises a cup-shaped inner case 30 that supports a laterally movable resilient elastomeric seal element 32. The seal element 32 has a radially inwardly facing sealing surface 34 that engages the valve stem 16 and an axially facing sealing surface 36 that engages a complementary surface 38 on a cup-shaped outer case 40. A radially inwardly extending surface 42 on the inner case 30 serves as a sliding surface for a seal support washer 44 which supports the elastomeric seal 32. The seal element 32 is bonded to the seal support washer 44.

Thus, a seal is effected by the washer 44 and an axially facing portion of the seal element 32 against the inner and outer cases 30 and 40, respectively, when the seal support washer 44 shifts to self center on the valve stem 16 and valve guide 12 upon installation or operation. The cup-shaped inner case 30 supports an "O-ring" 46 for holding and sealing the case 30 to the guide 12 to complete the seal between the valve 10 and valve guide 12.

In accordance with one feature of the instant invention, the outer case 40 is press fit in nesting relationship over the inner case 30 with the seal support washer 44 positioned therebetween. The outer case 40 bottoms out on a radial flange 50 on the inner case 30, thereby to create and maintain a constant gap between radial flanges 51 and 52 on the inner and outer cases 30 and 40, respectively, which allows the washer 44 and seal 32 to move radially therebetween while maintaining a constant seal.

The outer case 40 extends upwardly to substantially enclose the top of the seal element 32 as well as to retain a garter spring 54 within a complementary groove in the seal element 32. Preferably, the flat seal support washer 44 is made of a relatively soft material (e.g. plastic) with an I.D. slightly larger than the O.D. of the valve stem 16 so as to center the seal 32 around the valve stem yet wear before the valve stem in the event of interference.

While disclosing the preferred embodiment of the invention, it should be appreciated that the invention is susceptible of modification without departing from the scope of the following claims.

I claim:

1. A fixed valve stem oil seal comprising
   a cup-shaped inner case engageable with a valve guide of a piston-type internal combustion engine, said inner case having an upper radially extending flange with a central aperture for the acceptance of a valve stem, a cup-shaped outer case telescoped over said inner case in nesting relationship and having a radially extending flange disposed in spaced relation to the flange on said inner case, and a seal element disposed between the radial flanges on said inner and outer cases and radially movable relative thereto, said seal element having a first sealing surface engageable with the valve stem and a second washer-like sealing surface engageable with the radial flanges on said cases so as to effect a seal between said valve and said valve guide, said inner case having means engageable with said outer case to limit said nesting relationship so as to maintain a constant gap between said radial flanges on the inner and outer cases which allows the washer-like sealing surface to move radially therebetween to accommodate misalignment of a valve associated with said valve guide while maintaining a constant seal.

2. A valve stem oil seal in accordance with claim 1 wherein said inner case has a radially extending shoulder and said outer case is engaged therewith to control the spacing between the radial flanges on said inner and outer cases.

3. A valve stem oil seal in accordance with claim 2 wherein said first seal element surface faces radially and said second seal element surface faces axially.

* * * * *